US012641699B2

(12) United States Patent
Donners et al.

(10) Patent No.: US 12,641,699 B2
(45) Date of Patent: May 26, 2026

(54) CIRCADIAN LIGHTING FOR MODERATE LIGHT LEVELS

(71) Applicant: SIGNIFY HOLDING B.V., Eindhoven (NL)

(72) Inventors: Maurice Alexander Hugo Donners, Waalre (NL); Bianca Maria Irma Van Der Zande, Heeze (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 68 days.

(21) Appl. No.: 18/292,432

(22) PCT Filed: Jul. 18, 2022

(86) PCT No.: PCT/EP2022/070041

§ 371 (c)(1),
(2) Date: Jan. 26, 2024

(87) PCT Pub. No.: WO2023/006471

PCT Pub. Date: Feb. 2, 2023

(65) Prior Publication Data

US 2025/0089146 A1 Mar. 13, 2025

(30) Foreign Application Priority Data

Jul. 27, 2021 (EP) .................................... 21187840

(51) Int. Cl.
*H05B 45/20* (2020.01)
*H05B 47/17* (2020.01)

(52) U.S. Cl.
CPC .................................... *H05B 47/17* (2020.01)

(58) Field of Classification Search
CPC ........ H05B 45/20; H05B 47/00; H05B 47/10; H05B 47/11; H05B 47/17; F21V 9/00; F21V 9/08; F21V 9/40
See application file for complete search history.

(56) References Cited

U.S. PATENT DOCUMENTS

2013/0218240 A1 8/2013 Feng et al.
2015/0062892 A1* 3/2015 Krames .................. H05B 47/16 362/231

(Continued)

FOREIGN PATENT DOCUMENTS

WO 2016199101 A2 12/2016
WO 2020097597 A1 5/2020

*Primary Examiner* — Thai Pham

(57) ABSTRACT

The invention provides a light generating system (1000) comprising (i) a light generating device (100) configured to generate device light (101) having a controllable radiant flux and a controllable spectral power distribution, and (ii) a control system (300) configured to control the radiant flux and the spectral power distribution of the device light (101); wherein: (A) a ratio B/Y of the device light (101) is defined as a ratio of a radiant flux of the device light (101) in the 450-500 nm wavelength range and of a radiant flux of the device light (101) in the 550-600 nm wavelength range; (B) in a first operational mode of the light generating system (1000) the control system (300) is configured to change from a first device light setting to a second device light setting, different from the first device light setting; (C) the first device light setting and the second device light setting are selected from: (a) a high radiant flux first setting ($S_1$) wherein the device light (101) is first light with a first radiant flux $I_1$ and a first B/Y ratio $R_1$; and (b) a low radiant flux second setting ($S_2$) wherein the device light (101) is second light with a second radiant flux $I_2$ and a second B/Y ratio $R_2$; and (D) $I_2<I_1$, and $R_1<R_2$.

15 Claims, 3 Drawing Sheets

(56) References Cited

U.S. PATENT DOCUMENTS

| | | | | |
|---|---|---|---|---|
| 2016/0366746 | A1 * | 12/2016 | van de Ven | F21K 9/60 |
| 2021/0154490 | A1 | 5/2021 | Paulsen et al. | |
| 2022/0022381 | A1 * | 1/2022 | Li | F21V 14/006 |

* cited by examiner

CIRCADIAN LIGHTING FOR MODERATE LIGHT LEVELS

CROSS-REFERENCE TO PRIOR APPLICATIONS

This application is the U.S. National Phase application under 35 U.S.C. § 371 of International Application No. PCT/EP2022/070041, filed on Jul. 18, 2022, which claims the benefit of European Patent application Ser. No. 21/187,840.0, filed on Jul. 27, 2021. These applications are hereby incorporated by reference herein.

FIELD OF THE INVENTION

The invention relates to a light generating system and to a method for controlling light, such as from the light generating system.

BACKGROUND OF THE INVENTION

Light sources designed to take into account the circadian rhythm are known in the art. For instance, US2015062892, describes a light source comprising: at least one first LED emission source characterized by a first emission; and at least one second LED emission source characterized by a second emission; wherein the first emission and the second emission are configured to provide a first combined emission and a second combined emission; the first combined emission is characterized by a first SPD and fractions Fv1 and Fc1; the second combined emission is characterized by a second SPD and fractions Fv2 and Fc2; Fv1 represents the fraction of power of the first SPD in the wavelength range from 400 nm to 440 nm; Fc1 represents the fraction of power of the first SPD in the wavelength range from 440 nm to 500 nm; Fv2 represents the fraction of power of the second SPD in the wavelength range from 400 nm to 440 nm; Fc2 represents the fraction of power of the second SPD in the wavelength range from 440 nm to 500 nm; the first SPD and the second SPD have a color rendering index above 80; Fv1 is at least 0.05; Fc2 is at least 0.1; and Fc1 is less than Fc2 by at least 0.02.

WO2020/097597A discloses an apparatus for converting an existing light source into a biofriendly light source, the apparatus comprising an energy conversion component removably attached to the existing light source, wherein the energy conversion component is configured to convert light from the existing light source into a light in either of a first state with a M/P ratio of XI, where XI is at least 0.70, a correlated color temperature of 4000-14000 K, and an average CRI of at least 70, and of a second state with a M/P ratio of X2, where X2 is no more than 0.40, a correlated color temperature of 2200-4000 K, and an average CRI of at least 70.

SUMMARY OF THE INVENTION

Critical to our sleep/wake cycle is melatonin, a hormone that promotes sleep during night time. During day time, natural daylight with high correlated color temperature (CCT; herein also indicated as "color temperature") and intensity suppresses melatonin production in the body and as a result energizes people, making them more awake and alert. At the beginning and end of the day the spectrum is shifted towards lower CCT and intensity levels, causing melatonin secretion.

Over about 60% of adults get fewer hours of sleep than what they think they need. Further, close to three in ten parents (29%) report experiencing insomnia (sleeplessness) at least a few nights a week. The production of melatonin is directly impacted by light, both natural light and artificial light. Bright evening light can suppress melatonin production and delay sleep and make it more difficult to wake up in the morning. In particular the last two hours before bedtime it appears beneficial to use only light that is dim and low in blue content. Many people use artificial lighting in the hours before going to sleep, for example for reading. But exposure to light in the evening, can suppress melatonin production and prevent sleepiness. Further, it may also in (other) situations be desirable to have low radiant flux light while nevertheless there is a necessity to stay alert. It appears however, that present lamps may not satisfactorily address these issues.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

In a first aspect, the invention provides a light generating system ("system") comprising (i) a light generating device ("device") and a control system ("controller"). Especially, the light generating device is configured to generate device light having a controllable radiant flux and a controllable spectral power distribution. Further, especially the control system may be configured to control the radiant flux and the spectral power distribution of the device light. In embodiments, a ratio B/Y of the device light is defined as a ratio of a radiant flux of the device light in the 450-500 nm wavelength range and a radiant flux of the device light in) the 550-600 nm wavelength range. In embodiments, in a first operational mode of the light generating system the control system may be configured to change from a first device light setting to a second device light setting, different from the first device light setting. In specific embodiments, the first device light setting and the second device light setting may be selected from: (a) a high radiant flux first setting ($S_1$) wherein the device light is first light with a first radiant flux $I_1$ and a first B/Y ratio $R_1$; and (b) a low radiant flux second setting ($S_2$) wherein the device light is second light with a second radiant flux $I_2$ and a second B/Y ratio $R_2$. In specific embodiments, $I_2<I_1$. Yet further, in specific embodiments $R_1<R_2$. Hence, especially the invention provides a light generating system comprising (i) a light generating device configured to generate device light having a controllable radiant flux and a controllable spectral power distribution, and (ii) a control system configured to control the radiant flux and the spectral power distribution of the device light; wherein: (A) a ratio B/Y of the device light is defined as a ratio of a radiant flux of the device light in the 450-500 nm wavelength range and of a radiant flux of the device light in the 550-600 nm wavelength range; (B) in a first operational mode of the light generating system the control system is configured to change from a first device light setting to a second device light setting, different from the first device light setting; (C) the first device light setting and the second device light setting are selected from: (a) a high radiant flux first setting ($S_1$) wherein the device light is first light with a first radiant flux $I_1$ and a first B/Y ratio $R_1$; and (b) a low radiant flux second setting ($S_2$) wherein the device light is second light with a second radiant flux $I_2$ and a second B/Y ratio $R_2$; and (D) $I_2<I_1$, and $R_1<R_2$.

With such system it may be possible to provide light that may not suppress melatonin at a relative low light intensity. In contrast to earlier concepts, it seems that a relatively higher blue content at low intensity levels may promote sleep, whereas a relatively higher yellow level at high intensity may (also) promote sleep. Hence, the present system may provide—amongst others—the possibility to provide light that may promote sleep at different dimming levels, and may e.g. be used to dim the intensity down, while maintaining the non-suppressing effects on melatonin by shifting the spectral power distributions.

As indicated above, the light generating system may comprise a light generating device configured to generate device light having a controllable radiant flux and a controllable spectral power distribution. The light generating device may comprise one or more light sources, which, alone or together, allow control of the radiant flux and the spectral power distribution of the device light.

The term "radiant flux" may especially refer to the radiant energy emitted per unit time (by the light generating device). Instead of the term "radiant flux", also the terms "intensity" or "radian power" may be applied. The term "radiant flux" may have as unit an energy, like especially Watts. The term "spectral power distribution" especially refers the power distribution of the light (especially in Watts) as function of the wavelength (especially in nanometers), especially in embodiments over the human visible wavelength range (380-780 nm). Especially, the term "spectral power distribution" may refer to a radiant flux per unit frequency or wavelength, often indicated in Watt/nm. Instead of the term "spectral power distribution" also the term "spectral flux" may be applied. Hence, instead of the phrase "controllable spectral power distribution", also the phrase "controllable spectral flux" may be applied. The spectral flux may be indicated as power (Watt) per unit frequency or wavelength. Especially, herein the spectral flux is indicated as the radiant flux per unit wavelength (W/nm). Further, herein spectral fluxes and radiant fluxes are especially based on the spectral power of the device light over the 380-780 nm wavelength range. Hence, the ratio of blue-yellow, which is herein determined over the range of 450-500 nm and 550-600 nm, does not necessarily imply that there is no spectral power in the wavelength ranges of 380-450 nm and/or 500-550 nm, and/or 600-780 nm (see further also below) (or optionally even outside the visible wavelength range).

The term "light source" may in principle relate to any light source known in the art. It may be a conventional (tungsten) light bulb, a low pressure mercury lamp, a high pressure mercury lamp, a fluorescent lamp, a LED (light emissive diode), OLED, laser, etc. In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light sources may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED (phosphor converted LED). In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source is especially configured to generate light source light having an optical axis (O), (a beam shape,) and a spectral power distribution. The light source light may in embodiments comprise one or more bands, having band widths as known for lasers. The optical axis may coincide with the direction of the light with the highest radiant intensity.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light as such, like a blue LED, is a light source. A combination of a solid state light source (as light generating element) and a light converter element, such as a blue LED and a light converter element, optically coupled to the solid state light source, may also be a light source. Hence, a white LED is a light source.

The term "light source" herein may also refer to a light source comprising a solid state light source, such as an LED or a laser diode or a superluminescent diode. The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation. In embodiments, the term "light source" may also refer to a combination of a light generating device, like a LED, and an optical filter, which may change the spectral power distribution of the light generated by the light generating device.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light generated by the system may essentially consist of the device light.

Further, the system may comprise a control system configured to control the radiant flux and the spectral power distribution of the device light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

In operational modes, the control system may change from one device light setting to another device light setting, different from the first device light setting (like in embodiments from a first device light setting to a second device light setting). Hence, in such operational mode, the spectral power distribution may change and/or the radiation flux may change. In specific embodiments, the radiant flux may change and/or the R-value may change.

However, in other operational modes, the device light setting may be fixed. Hence, in such operational modes, the radiant flux and the spectral power distribution may essentially stay unaltered during such operational modes.

However, in embodiments a control system may be available, that is adapted to provide at least the controlling mode.

Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Here below, at least four operational modes are described. In embodiments, the system may be configured to execute one or more of these operational modes. Or, in other words, the system may be operated in one or more of these operational modes. Especially, the system may execute at least the first operational modes. When the system is able to execute more than one operational modes, the operational modes may e.g. be executed consecutively or may e.g. be executed in response to a sensor signal or may e.g. be executed in dependence of a user instruction via a user interface. In embodiments, the system may be configured to execute only one of these operational modes.

Especially, the system may be configured to provide in one or more operational modes (of the system), white device light. The term "white light" herein, is known to the person skilled in the art. It especially relates to light having a correlated color temperature (CCT) between about 1800 K and 20000 K, such as between 2000 and 20000 K, especially 2700-20000 K, like in embodiments up to about 14000 K; for general lighting especially in the range of about 2700 K and 6500 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. Visible light having a CCT of lower than 1800 K may also be possible, which may appear more red(dish) than white, such as light having a CCT of about 800-1800 K.

The terms "visible", "visible light" or "visible emission" and similar terms refer to light having one or more wavelengths in the range of about 380-780 nm. Herein, UV may especially refer to a wavelength selected from the range of 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

This device light may have a variable ratio of intensity in a wavelength range that may comprise at least part of the blue wavelength range and in a wavelength range that may comprise at least part of the yellow wavelength range. Note that also in other wavelength ranges the intensity may be variable, such as in the green and/or red wavelength ranges.

The terms "blue light" or "blue emission" herein especially relates to light having a wavelength in the range of about 450-500 nm (including some violet and cyan hues). Instead of the term "blue light", also the term "blueish light" may be applied. The terms "yellow light" or "yellow emission" herein especially relate to light having a wavelength in the range of about 550-600 nm. Instead of the term "yellow light", also the term "yellowish light" may be applied. The terms "orange light" or "orange emission" herein especially relate to light having a wavelength in the range of about 600-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

Hence, especially herein a ratio B/Y of the device light is defined as a ratio of a radiant flux of the device light in the 450-500 nm wavelength range of the device light and in the 550-600 nm wavelength range. Hence, from the total radiant flux in the 380-780 nm range of the device light a first radiant flux of the device light in the 450-500 nm wavelength range, indicated with B, and a second radiation flux of the device light in the 550-600 nm wavelength range, indicated with Y, are used to define the ratio B/Y. The first radiant flux or the radiant flux of the device light in the 450-500 nm wavelength range may thus be the radiant flux integrated over the 450-500 nm range. Likewise, the second radiant flux or the radiant flux of the device light in the 550-600 nm wavelength range may thus be the radiant flux integrated over the 550-600 nm range.

It appears that by controlling this ratio, the suppression of melatonin may be controlled. Basically, the following settings (S1-S4) may apply:

| Light level | Sleep/rest-no melatonin suppression | Alert/active-melatonin suppression |
|---|---|---|
| Low light level ($I_2$ and $I_4$, respectively) | $S_2$: high B/Y ($R_2$) | $S_4$: low B/Y ($R_4$) |
| High light level ($I_1$ and $I_3$, respectively) | $S_1$: low B/Y ($R_1$) | $S_3$: high B/Y ($R_3$) |

The settings are indicated with indications $S_1$, $S_2$, $S_3$, and $S_4$. The associated ratios are indicated with indications $R_1$, $R_2$, $R_3$, and $R_4$.

As indicated above, the phrase "a radiant flux of the device light in the 450-500 nm wavelength range", and similar phrases, may refer to the integrated intensity (especially radiant flux) over the 450-500 nm wavelength range of the spectral power distribution. Likewise, phrase "a radiant flux of the device light in the 550-600 nm wavelength range", and similar phrases, may (thus) refer to the integrated intensity (especially radiant flux) over the 550-600 nm wavelength range of the spectral power distribution.

In operation modes, one of the settings may be kept constant. In such embodiment, a control system may not necessarily be available, and the light generating device may have a fixed setting. In other operational modes, there may be at least a change from one setting selected from the four settings to another setting selected from the four settings. In yet other embodiments, there may be at least a change with one setting selected from the four settings. In the latter embodiments, a control system may be necessary as there may be a change in radiant flux and/or spectral power distribution over time.

In embodiments, in a first operational mode of the light generating system the control system may be configured to change from a first device light setting to a second device light setting, different from the first device light setting. For instance, this may be from high radiant flux first setting ($S_1$) to low radiant flux second setting ($S_2$), but this may also be from low radiant flux second setting ($S_2$) to high radiant flux first setting ($S_1$). It may also be a change from high radiant flux third setting ($S_3$) to low radiant flux fourth setting ($S_4$) or from a low radiant flux fourth setting ($S_4$) to high radiant flux third setting ($S_3$) (see also below). It may also be a change from high radiant flux third setting ($S_3$) to low radiant flux second setting ($S_2$) or from low radiant flux second setting ($S_2$) to high radiant flux third setting ($S_3$) (see also below). Yet, it may also be a change from high radiant flux first setting ($S_1$) to low radiant flux fourth setting ($S_4$) or from low radiant flux fourth setting ($S_4$) to high radiant flux first setting ($S_1$) (see also below). It may also be a change from high radiant flux third setting ($S_3$) to high radiant flux first setting ($S_1$) or from a high radiant flux first setting ($S_1$) to high radiant flux third setting ($S_3$) (see also below). It may also be a change from low radiant flux second setting ($S_2$) to low radiant flux fourth setting ($S_4$) or from a low radiant flux fourth setting ($S_4$) to low radiant flux second setting ($S_2$) (see also below).

For instance, in embodiments this may be a change from a high intensity setting wherein alertness or activity is desirable (especially high radiant flux third setting ($S_3$)), like artificial light in a hospital, to a low intensity setting during the night, wherein it is desirable that the intensity is reduced and people may sleep (especially low radiant flux second setting ($S_2$)). Between the high radiant flux with melatonin suppression and the low radiant flux setting without melatonin suppression, there may be a setting with (relatively) high intensity and no melatonin suppression (especially high radiant flux first setting ($S_1$)). However, after a night, the setting may again change from the low radiant flux second setting ($S_2$) to the high radiant flux third setting ($S_3$) via the high radiant flux first setting ($S_1$).

Embodiments Especially Related to a $S_1$-$S_2$ Transitions

Hence, in embodiments the first device light setting and the second device light setting may be selected from: (a) a high radiant flux first setting ($S_1$) wherein the device light is first light with a first radiant flux $I_1$ and a first B/Y ratio $R_1$; and (b) a low radiant flux second setting ($S_2$) wherein the device light is second light with a second radiant flux $I_2$ and a second B/Y ratio $R_2$. Especially, $I_2<I_1$, and $R_1<R_2$.

Hence, there may be change from the high radiant flux first setting ($S_1$) (e.g. evening) to the low radiant flux second setting ($S_2$) (e.g. night) or from the low radiant flux second setting ($S_2$) (e.g. night) to the high radiant flux first setting ($S_1$) ((early) morning). The high B/Y ratio $R_1$ at high intensity may be useful for preventing melatonin suppression and the low B/Y ratio $R_2$ at low intensity may also be useful for preventing melatonin suppression.

In embodiments, the light generating device may have a maximum radiant flux, which may in embodiments especially be such that at maximum radiant flux, a high light level will be provided. This may especially apply in applications for which the light generating device may be designed, like office lighting, hospital (room) lighting, hospitality lighting, lighting in corridors, domestic lighting, etc. However, this may e.g. also be useful for street lighting (road lighting), outdoor area lighting, etc.

In specific embodiments, the high light level may at least in the range of 10% or more of the maximum radiant flux and the low light level may be at maximum 90% of the maximum radiant flux, with the latter light level at least being smaller than the former light level. For instance, $I_1\geq0.6*I_{max}$ and $I_2\leq0.4*I_{max}$. Hence, in specific embodiments the light generating device may be able to generate device light with a maximum radiant flux $I_{max}$, wherein $I_1\geq0.1*I_{max}$ and $I_2\leq0.9*I_{max}$, and wherein $I_2/I_1\leq0.9$. For instance, in embodiments $I_1\geq0.1*I_{max}$ and $I_2\leq0.09*I_{max}$. In other embodiments, $I_1\geq0.9*I_{max}$ and $I_2\leq0.85*I_{max}$, such as $I_2\leq0.75*I_{max}$. In yet other embodiments, $I_1\geq0.6*I_{max}$ and $I_2\leq0.4*I_{max}$. In embodiments, $I_2/I_1\leq0.8$, such as $I_2/I_1\leq0.7$.

The phrases "the light generating device is able to generate device light" or "the light generating device may be able to generate device light", may indicate that the light generating device in an operational mode will provide such device light.

In embodiments, the second light may have a relatively high correlated color temperature. Dimmed light that may create a dimming scene may in general have a relatively low correlated color temperature. In embodiments, wherein at low light levels melatonin is desirable suppressed, e.g. to promote sleep, it appears, however, that a relatively high CCT may be desirable. For instance, the second correlated color temperature may be at least 2200 K. However, at relative high intensities, it may be desirable that the CCT is not too high, in order not to substantially suppress melatonin. Hence, the first correlated color temperature may in embodiments be at maximum about 3400 K. Hence, in specific embodiments the first light has a first correlated color temperature $T_{C1}$, wherein the second light has a second correlated color temperature $T_{C2}$, wherein: $T_{C1}\leq3400$K, $T_{C2}\geq2200$ K, and $T_{C2}\leq T_{C1}$. Further, in specific embodiments $R_2\geq2$. More especially, $R_1$ may be smaller than 0.41, even more especially smaller than 0.3, yet even more especially smaller than 0.25 and/or $R_2$ may be at least 0.2, such as at least about 0.23, even more especially at least about 0.25, like in embodiments at least about 0.4. In embodiments, $0.25\leq R_2\leq2.2$. Alternatively or additionally, in embodiments $0.05\leq R_4\leq0.25$.

The change from the high radiant flux first setting ($S_1$) to the low radiant flux second setting ($S_2$) or from the low radiant flux second setting ($S_2$) to the high radiant flux first setting ($S_1$) may in embodiments be gradual. For instance, this maybe via a linear gradual decrease or increase or via a non-linear decrease or increase. Hence, in embodiments the change (from the high radiant flux first setting ($S_1$) to the low radiant flux second setting ($S_2$) or from the low radiant flux second setting ($S_2$) to the high radiant flux first setting ($S_1$)) may be a gradual change over a change time selected from the range of 2-120 minutes, like at least 5 minutes, such as 15-120 minutes, like up to about 30 minutes. However, the change may in embodiments also be an immediate change. Further, in specific embodiments the control system may be configured to control the change from the first device light setting to the second device light setting in dependence of one or more of an input signal of a user interface, a sensor signal, and a timer.

Embodiments Especially Related to a $S_3$-$S_4$ Transitions

As indicated above, in an operational mode of the light generating system the control system may be configured to change from a device light setting to another device light setting, different from the former device light setting, which may in embodiments especially be a change from high radiant flux third setting ($S_3$) to low radiant flux fourth setting ($S_4$) or from a low radiant flux fourth setting ($S_4$) to high radiant flux third setting ($S_3$) (see also above). The change from a high radiant flux third setting ($S_3$) with a relatively high blue-yellow ratio R3 to a low radiant flux fourth setting ($S_4$) with a relatively low blue-yellow ratio R4 may be useful when lowering of the radiant flux is desirable but also melatonin suppression is desirable (in both the high radiant flux third setting ($S_3$) and the low radiant flux fourth setting ($S_4$). In such embodiments, the high radiant flux third setting ($S_3$) may provide device light with a higher correlated color temperature and the low radiant flux fourth setting ($S_4$) may provide device light with a lower correlated color temperature. This may also be indicated as "warm dimming".

For instance, in embodiments this may be a change from a high intensity setting wherein alertness or activity is desirable (especially high radiant flux third setting ($S_3$)), like artificial light in a hospital, a control room, etc., to a low intensity setting during the night, wherein it is desirable that the intensity is reduced but alertness is or activity is still desirable (especially low radiant flux fourth setting ($S_4$)). However, after a night, the setting may again change from the low radiant flux fourth setting ($S_4$) to the high radiant flux third setting ($S_3$).

In a second operational mode of light generating system the control system is configured to change from a third device light setting to a fourth device light setting, different from the third device light setting. The third device light setting and the fourth device light setting are selected from: (a) a high radiant flux third setting ($S_3$) wherein the device light is third light with a third radiant flux $I_3$ and a third B/Y ratio $R_3$; and (b) a low radiant flux fourth setting ($S_4$) wherein the device light is fourth light with a fourth radiant flux $I_3$ and a fourth B/Y ratio $R_3$, wherein $I_4<I_3$, and $R_3>R_4$.

Also, in an aspect the invention provides a light generating system comprising (i) a light generating device configured to generate device light having a controllable radiant flux and a controllable spectral power distribution, and (ii) a control system configured to control the radiant flux and the spectral power distribution of the device light; wherein: (a) a ratio B/Y of the device light is defined as a ratio of a radiant flux of the device light in the 450-500 nm wavelength range and of a radiant flux of the device light in the 550-600 nm wavelength range; (b) in a second operational mode of light generating system the control system is configured to change from a third device light setting to a fourth device light setting, different from the third device light setting; (c) the third device light setting and the fourth device light setting are selected from: (a) a high radiant flux third setting ($S_3$) wherein the device light is third light with a third radiant flux $I_3$ and a third B/Y ratio $R_3$; and (b) a low radiant flux fourth setting ($S_4$) wherein the device light is fourth light with a fourth radiant flux $I_3$ and a fourth B/Y ratio $R_3$; and (d) $I_4<I_3$, and $R_3>R_4$.

Hence, there may be change from the high radiant flux third setting ($S_3$) (e.g. day or evening) to the low radiant flux fourth setting ($S_4$) (e.g. evening or night) or from the low radiant flux fourth setting ($S_4$) (e.g. evening night) to the high radiant flux third setting ($S_3$) ((early) morning or day). The high B/Y ratio $R_3$ at high intensity may be useful for melatonin suppression and the low B/Y ratio $R_4$ at low intensity may also be useful for melatonin suppression.

In embodiments, the light generating device may have a maximum radiant flux, which may in embodiments especially be such that at maximum radiant flux, a high light level will be provided. This may especially apply in applications for which the light generating device may be designed, like office lighting, hospital (room) lighting, hospitality lighting, lighting in corridors, domestic lighting, control room lighting, etc. etc.

In specific embodiments, the high light level may at least in the range of 10% or more of the maximum radiant flux and the low light level may be at maximum 90% of the maximum radiant flux, with the latter light level at least being smaller than the former light level. For instance, $I_3 \geq 0.6*I_{max}$ and $I_4 \leq 0.4*I_{max}$. Hence, in specific embodiments the light generating device may be able to generate device light with a maximum radiant flux $I_{max}$, wherein $I_3 \geq 0.1*I_{max}$ and $I_4 \leq 0.9*I_{max}$, and wherein $I_4/I_3 \leq 0.9$. For instance, in embodiments $I_3 \geq 0.1*I_{max}$ and $I_4 \leq 0.09*I_{max}$. In other embodiments, $I_3 \geq 0.9*I_{max}$ and $I_4 \leq 0.85*I_{max}$, such as $I_4 \leq 0.75*I_{max}$. In yet other embodiments, $I_3 \geq 0.6*I_{max}$ and $I_4 \leq 0.4*I_{max}$. In embodiments, $I_4/I_3 \leq 0.8$, such as $I_4/I_3 \leq 0.7$.

In embodiments, the fourth light may have a relatively low correlated color temperature. In embodiments, wherein at low light levels melatonin is desirable suppressed, e.g. to promote sleep, it appears, however, that a relatively low CCT may be desirable. For instance, the fourth correlated color temperature may be at maximum 2450 K. However, at relative high intensities, it may be desirable that the CCT is relatively high, in order to substantially suppress melatonin. Hence, the third correlated color temperature may in embodiments be at least about 3000 K. Hence, in specific embodiments the third light may have a third correlated color temperature $T_{C3}$, wherein the fourth light has a fourth correlated color temperature $T_{C4}$, wherein: $T_{C3} \geq 3000$ K and $T_{C4} \leq 2450$ K. Further, in specific embodiments $R_4 \leq 0.41$, more especially $R_4 \leq 0.3$, even more especially $R_4$ smaller than 0.25. More especially, $R_3$ may be at least 0.25. Especially, in embodiments $0.25 \leq R_3 \leq 2.2$ and/or $R_4$ may be $0.05 \leq R_4 < 0.25$.

The change from the high radiant flux third setting ($S_3$) to the low radiant flux fourth setting ($S_4$) or from the low radiant flux fourth setting ($S_4$) to the high radiant flux third setting ($S_3$) may in embodiments be gradual. For instance, this maybe via a linear gradual decrease or increase or via a non-linear decrease or increase. Hence, in embodiments the change (from the high radiant flux third setting ($S_3$) to the low radiant flux fourth setting ($S_4$) or from the low radiant flux fourth setting ($S_4$) to the high radiant flux third setting ($S_3$)) may be a gradual change over a change time selected from the range of 2-120 minutes, like at least 5 minutes, such as 15-120 minutes, like up to about 30 minutes. However, the change may in embodiments also be an immediate change, or a change within 2 minutes, such as a change within 30 seconds, like a change within 1 second. Further, in embodiments the control system may be configured to control the change from the first device light setting to the second device light setting in dependence of one or more of an input signal of a user interface, a sensor signal, and a timer.

Embodiments Especially Related to a $S_2$-$S_3$ Transitions

As indicated above, in an operational mode of the light generating system the control system may be configured to change from a device light setting to another device light setting, different from the former device light setting, which may especially be a change from a high radiant flux third setting ($S_3$) to a low radiant flux second setting ($S_2$) or from a low radiant flux second setting ($S_2$) to a high radiant flux third setting ($S_3$) (see also above).

For instance, in embodiments this may be a change from a high intensity setting wherein alertness or activity is desirable (especially high radiant flux third setting ($S_3$)), to a low intensity setting during the night, wherein it is desirable that the intensity is reduced and but alertness or activity may be less desirable (especially low radiant flux second setting ($S_2$)). However, after a night, the setting may again change from the low radiant flux second setting ($S_2$) to the high radiant flux third setting ($S_3$).

Hence, in specific embodiments in a third operational mode of light generating system the control system may be configured to change from the third device light setting to the second device light setting, different from the third device light setting. Yet further, in specific embodiments the third device light setting and the first device light setting may be selected from: (a) the high radiant flux setting ($S_3$) wherein the device light is third light with the third radiant flux $I_3$ and the third B/Y ratio $R_3$; and (b)) the low radiant flux second setting ($S_2$) wherein the device light is second light with the second radiant flux $I_2$ and the second B/Y ratio $R_2$ as defined herein. In embodiments, $R_3>R_2$. Especially, in embodiments $I_2<I_3$. Further, in specific embodiments $0.5\leq R_2/R_3\leq 0.95$. In other, embodiments, however, $R_2>R_3$. Especially, in embodiments $I_3<I_2$. Further, in specific embodiments $0.5\leq R_3/R_2\leq 0.95$. When R2 is smaller than R3, this may be an embodiment of warm dimming. When R2 is larger than R3, this may be a kind of cool dimming, though substantially avoiding suppression of melatonin. This may e.g. be useful in hospital applications.

Yet, in an aspect the invention provides light generating system comprising (i) a light generating device configured to generate device light having a controllable radiant flux and a controllable spectral power distribution, and (ii) a control system configured to control the radiant flux and the spectral power distribution of the device light; wherein: (a) a ratio B/Y of the device light is defined as a ratio of a radiant flux of the device light in the 450-500 nm wavelength range and of a radiant flux of the device light in the 550-600 nm wavelength range; (b) in a third operational mode of light generating system the control system is configured to change from the third device light setting to the second device light setting, different from the third device light setting; (c) the third device light setting and the first device light setting are selected from: (a) the high radiant flux setting ($S_3$) wherein the device light is third light with the third radiant flux $I_3$ and the third B/Y ratio $R_3$; and (b)) the low radiant flux second setting ($S_2$) wherein the device light is second light with the second radiant flux $I_2$ and the second B/Y ratio $R_2$ according to any one of the preceding claims; and (d) $I_3<I_2$, and $0.5\leq R_2/R_3\leq 0.95$.

Hence, there may be change from the high radiant flux third setting ($S_3$) (e.g. evening) to the low radiant flux second setting ($S_2$) (e.g. night) or from the low radiant flux second setting ($S_2$) (e.g. night) to the high radiant flux third setting ($S_3$) ((early) morning). The high B/Y ratio $R_3$ at high intensity may be useful for melatonin suppression and the low B/Y ratio $R_2$ at low intensity may also be useful for preventing melatonin suppression.

In embodiments, the light generating device may have a maximum radiant flux, which may in embodiments especially be such that at maximum radiant flux, a high light level will be provided. This may especially apply in applications for which the light generating device may be designed, like office lighting, hospital (room) lighting, hospitality lighting, lighting in corridors, domestic lighting, etc. etc.

In specific embodiments, the high light level may at least in the range of 10% or more of the maximum radiant flux and the low light level may be at maximum 90% of the maximum radiant flux, with the latter light level at least being smaller than the former light level. For instance, $I_3\geq 0.6*I_{max}$ and $I_2\leq 0.4*I_{max}$. Hence, in specific embodiments the light generating device may be able to generate device light with a maximum radiant flux $I_{max}$, wherein $I_3\geq 0.1*I_{max}$ and $I_2\leq 0.9*I_{max}$, and wherein $I_2/I_3\leq 0.9$. For instance, in embodiments $I_3\geq 0.1*I_{max}$ and $I_2\leq 0.09*I_{max}$. In other embodiments, $I_3\geq 0.9*I_{max}$ and $I_2\leq 0.85*I_{max}$, such as $I_2\leq 0.75*I_{max}$. In yet other embodiments, $I_3\geq 0.6*I_{max}$ and $I_2\leq 0.4*I_{max}$. In embodiments, $I_2/I_3\leq 0.8$, such as $I_2/I_3\leq 0.7$.

In embodiments, the second light may have a relatively high correlated color temperature. Dimmed light that may create a dimming scene may in general have a relatively low correlated color temperature. In embodiments, wherein at low light levels melatonin is desirable suppressed, e.g. to promote sleep, it appears, however, that a relatively high CCT may be desirable. For instance, the second correlated color temperature may be at least 2700 K. However, at relative high intensities, it may be desirable that the CCT is also relatively high, in order to substantially suppress melatonin. Hence, the third correlated color temperature may in embodiments be at least about 4000 K. Hence, in specific embodiments the third light has a third correlated color temperature $T_{C3}$, wherein the second light has a second correlated color temperature $T_{C2}$, wherein: $T_{C3}\geq 1200K$, $T_{C2}\geq 2200$ K, and $T_{C2}<T_{C3}$. Further, in specific embodiments $R_2\geq 0.2$, such as especially at least 0.23, even more especially at least 0.25. Yet further, R3 may be at least 0.2, such as at least 0.23, even more especially at least 0.25. More especially, $R_3$ may be $0.25\leq R_3\leq 2.2$ and/or $R_2$ may be $0.25\leq R_2\leq 2.2$.

The change from the high radiant flux third setting ($S_3$) to the low radiant flux second setting ($S_2$) or from the low radiant flux second setting ($S_2$) to the high radiant flux third setting ($S_3$) may in embodiments be gradual. For instance, this maybe via a linear gradual decrease or increase or via a non-linear decrease or increase. Hence, in embodiments the change (from the high radiant flux third setting ($S_3$) to the low radiant flux second setting ($S_2$) or from the low radiant flux second setting ($S_2$) to the high radiant flux third setting ($S_3$)) may be a gradual change over a change time selected from the range of 2-120 minutes, like at least 5 minutes, such as 15-120 minutes, like up to about 30 minutes. However, the change may in embodiments also be an immediate change. Further, in specific embodiments the control system may be configured to control the change from the third device light setting to the second device light setting in dependence of one or more of an input signal of a user interface, a sensor signal, and a timer.

Embodiments Especially Related to a $S_1$-$S_4$ Transitions

In yet a further aspect, the invention provides a light generating system comprising (i) a light generating device configured to generate device light having a controllable radiant flux and a controllable spectral power distribution, and (ii) a control system configured to control the radiant flux and the spectral power distribution of the device light; wherein: (A) a ratio B/Y of the device light is defined as a ratio of a radiant flux of the device light in the 450-500 nm wavelength range and of a radiant flux of the device light in the 550-600 nm wavelength range; (B) in a fourth operational mode of the light generating system the control system is configured to change from a first device light setting to a fourth device light setting, different from the first device light setting; (C) the first device light setting and the fourth device light setting are selected from: (a) a high radiant flux first setting ($S_1$) wherein the device light is first light with a first radiant flux $I_1$ and a first B/Y ratio $R_1$; and (b) a low radiant flux fourth setting ($S_4$) wherein the device light is fourth light with a fourth radiant flux $I_4$ and a fourth B/Y ratio $R_4$; and (D) $I_4<I_1$. Further, in specific embodiments $0.5\leq R_4/R_1\leq 0.95$.

In yet other embodiments, however, $R_4>R_1$. For instance, $0.5\leq R_1/R_4\leq 0.95$. This may e.g. be useful for in situations where at high flux sleep is desirably suppressed but at low flux alertness and/or good color rendering may be (still) desirable.

Hence, especially in embodiments, $R_4<0.25$ and/or $R_1<0.25$. Further, especially in embodiments $R_2\geq 0.25$ and/or $R_3\geq 0.25$.

In specific embodiments, the high light level may at least in the range of 10% or more of the maximum radiant flux and the low light level may be at maximum 90% of the maximum radiant flux, with the latter light level at least being smaller than the former light level. For instance, $I_1 \geq 0.6*I_{max}$ and $I_4 \leq 0.4*I_{max}$. Hence, in specific embodiments the light generating device may be able to generate device light with a maximum radiant flux $I_{max}$, wherein $I_1 \geq 0.1*I_{max}$ and $I_4 \leq 0.9*I_{max}$, and wherein $I_1/I_4 \leq 0.9$. For instance, in embodiments $I_1 \geq 0.1*I_{max}$ and $I_4 \leq 0.09*I_{max}$. In other embodiments, $I_1 \geq 0.9*I_{max}$ and $I_4 \leq 0.85*I_{max}$, such as $I_4 \leq 0.75*I_{max}$. In yet other embodiments, $I_1 \geq 0.6*I_{max}$ and $I_4 \leq 0.4*I_{max}$. In embodiments, $I_4/I_1 \leq 0.8$, such as $I_4/I_1 \leq 0.7$.

The change from the high radiant flux first setting ($S_1$) to the low radiant flux fourth setting ($S_4$) or from the low radiant flux fourth setting ($S_4$) to the high radiant flux first setting ($S_1$) may in embodiments be gradual. For instance, this maybe via a linear gradual decrease or increase or via a non-linear decrease or increase. Hence, in embodiments the change (from the high radiant flux first setting ($S_1$) to the low radiant flux fourth setting ($S_4$) or from the low radiant flux fourth setting ($S_4$) to the high radiant flux first setting ($S_1$)) may be a gradual change over a change time selected from the range of 2-120 minutes, like at least 5 minutes, such as 15-120 minutes, like up to about 30 minutes. However, the change may in embodiments also be an immediate change. Further, in specific embodiments the control system may be configured to control the change from the first device light setting to the fourth device light setting in dependence of one or more of an input signal of a user interface, a sensor signal, and a timer.

For instance, the low intensity fourth setting may be useful for indoor light situations wherein vision via a window to a low-light level outdoor scene is required. In such a case, the visual system should be dark adapted, but in the meantime, melatonin should be suppressed to maintain alertness.

Embodiments Especially Related to a $S_1$-$S_3$ Transitions

In yet a further aspect, the invention provides a light generating system comprising (i) a light generating device configured to generate device light having a controllable radiant flux and a controllable spectral power distribution, and (ii) a control system configured to control the radiant flux and the spectral power distribution of the device light; wherein: (A) a ratio B/Y of the device light is defined as a ratio of a radiant flux of the device light in the 450-500 nm wavelength range and of a radiant flux of the device light in the 550-600 nm wavelength range; (B) in a fifth operational mode of the light generating system the control system is configured to change from a first device light setting to a third device light setting, different from the first device light setting; (C) the first device light setting and the third device light setting are selected from: (a) a high radiant flux first setting ($S_1$) wherein the device light is first light with a first radiant flux $I_1$ and a first B/Y ratio $R_1$; and (b) a high radiant flux third setting ($S_3$) wherein the device light is third light with a third radiant flux $I_3$ and a third B/Y ratio $R_3$. Further, in specific embodiments, $R_3/R_1 \geq 1$, such as $R_3/R_1 > 1$. In yet further specific embodiments, $R_3/R_1 = 1$. Further, in specific $I_3/I_1 \geq 1$, such as $I_3/I_1 > 1$. In yet further specific embodiments, $I_3/I_1 = 1$.

In yet other embodiments, however $I_1/I_3 > 1$. This may also be a kind of cool dimming, which may e.g. be of interest for keeping persons alert at relatively low light fluxes.

Hence, especially in embodiments, $0.05 \leq R_1 < 0.25$ and/or $0.25 \leq R_3 \leq 2.2$. Further, especially in embodiments $R_3 > 0.25$, such as $R_3 \geq 0.35$, and/or $R_1 < 0.25$, such as $R_1 \leq 0.2$.

An operational mode wherein a transition takes place between the first high radiant flux setting and third radiant flux setting may for instance be useful for suppressing jetlag effects or for promoting sport performances. Other applications may be lighting at high risk sites, e.g. a control room of a nuclear reactor. However, for sport applications this may also be useful.

The change from the high radiant flux first setting ($S_1$) to the high radiant flux third setting ($S_3$) or from the high radiant flux third setting ($S_3$) to the high radiant flux first setting ($S_1$) may in embodiments be gradual. For instance, this maybe via a linear gradual decrease or increase or via a non-linear decrease or increase. Hence, in embodiments the change (from the high radiant flux first setting ($S_1$) to the high radiant flux third setting ($S_3$) or from the high radiant flux third setting ($S_3$) to the high radiant flux first setting ($S_1$)) may be a gradual change over a change time selected from the range of 2-120 minutes, like at least 5 minutes, such as 15-120 minutes, like up to about 30 minutes. However, the change may in embodiments also be an immediate change. Further, in specific embodiments the control system may be configured to control the change from the first device light setting to the third device light setting in dependence of one or more of an input signal of a user interface, a sensor signal, and a timer.

Embodiments Especially Related to a $S_2$-$S_4$ Transitions

In yet a further aspect, the invention provides a light generating system comprising (i) a light generating device configured to generate device light having a controllable radiant flux and a controllable spectral power distribution, and (ii) a control system configured to control the radiant flux and the spectral power distribution of the device light; wherein: (A) a ratio B/Y of the device light is defined as a ratio of a radiant flux of the device light in the 450-500 nm wavelength range and of a radiant flux of the device light in the 550-600 nm wavelength range; (B) in a sixth operational mode of the light generating system the control system is configured to change from a second device light setting to a fourth device light setting, different from the second device light setting; (C) the second device light setting and the fourth device light setting are selected from: (a) a low radiant flux second setting ($S_2$) wherein the device light is second light with a second radiant flux $I_2$ and a second B/Y ratio $R_2$; and (b) a low radiant flux fourth setting ($S_4$) wherein the device light is fourth light with a fourth radiant flux $I_4$ and a fourth B/Y ratio $R_4$. Further, in specific embodiments $R_4/R_2 \leq 1$, such as $R_4/R_2 < 1$. Further, in specific embodiments $I_4/I_2 \leq 1$, such as $I_4/I_2 < 1$. In other embodiments, however, $I_4/I_2 \geq 1$, such as $I_4/I_2 > 1$. In yet further specific embodiments, $I_4/I_2 = 1$.

Hence, especially in embodiments, $0.05 \leq R_4 < 0.25$ and/or $0.25 \leq R_2 \leq 2.2$. Further, especially in embodiments $R_2 > 0.25$, such as $R_2 \geq 0.35$, and/or $R_4 < 0.25$, such as $R_4 \leq 0.2$.

An operational mode wherein a transition takes place between the second low radiant flux setting and low radiant fourth flux setting may for instance be useful for e.g. outdoor lighting. For instance, first at a relatively high (but below 30 lux Eeye) level, I4, one may desire to keep road users alert (especially with R<0.25) and later in the night, light may be dimmed to a lower level I2 ($I_2 < I_4$), and it may be desirable not to suppress melatonin, which may e.g. be done by increasing R to R>0.25. Especially, in embodiments $I_4/I_2 > 1$.

The change from the low radiant flux second setting ($S_2$) to the low radiant flux fourth setting ($S_4$) or from the low radiant flux fourth setting ($S_4$) to the low radiant flux second setting ($S_2$) may in embodiments be gradual. For instance, this maybe via a linear gradual decrease or increase or via a non-linear decrease or increase. Hence, in embodiments the change (from the low radiant flux second setting ($S_2$) to the low radiant flux fourth setting ($S_4$) or from the low radiant flux fourth setting ($S_4$) to the low radiant flux second setting ($S_2$)) may be a gradual change over a change time selected from the range of 2-120 minutes, like at least 5 minutes, such as 15-120 minutes, like up to about 30 minutes. However, the change may in embodiments also be an immediate change. Further, in specific embodiments the control system may be configured to control the change from the second device light setting to the fourth device light setting in dependence of one or more of an input signal of a user interface, a sensor signal, and a timer.

Further Aspects and Embodiments

In embodiments, changes from one setting to the other setting may be executed without an intermediate other setting. However, in other embodiments changes from one setting to the other setting may be executed via an intermediate other setting (of the herein described settings).

In yet a further aspect, the invention also provides a method for controlling a controllable radiant flux and a controllable spectral power distribution of device light wherein: (A) a ratio B/Y of the device light is defined as a ratio of a radiant flux of the device light in the 450-500 nm wavelength range and of a radiant flux of the device light in the 550-600 nm wavelength range; (B) the method comprises changing (in a first operational mode) from a first device light setting to a second device light setting, different from the first device light setting; (C) the first device light setting and the second device light setting are selected from: (a) a high radiant flux first setting ($S_1$) wherein the device light is first light with a first radiant flux $I_1$ and a first B/Y ratio $R_1$; and (b) a low radiant flux second setting ($S_2$) wherein the device light is second light with a second radiant flux $I_2$ and a second B/Y ratio $R_2$; and (D) $I_2<I_1$, and $R_1<R_2$. In specific embodiments, $R_2 \geq 0.25$ and wherein $R_1<0.25$.

Further embodiments in relation to this (first) operational mode are also described above.

In a specific embodiment, the method may further comprises: changing (in a second operational mode) from a third device light setting to a fourth device light setting, different from the third device light setting; wherein (i) the third device light setting and the fourth device light setting are selected from: (a) a high radiant flux third setting ($S_3$) wherein the device light is third light with a third radiant flux $I_3$ and a third B/Y ratio $R_3$; and (b) a low radiant flux fourth setting ($S_4$) wherein the device light is fourth light with a fourth radiant flux $I_3$ and a fourth B/Y ratio $R_3$; and (ii) $I_4<I_3$, and $R_3>R_4$.

Yet, in a further aspect the invention provides a method for controlling a controllable radiant flux and a controllable spectral power distribution of device light wherein: (A) a ratio B/Y of the device light is defined as a ratio of a radiant flux of the device light in the 450-500 nm wavelength range and of a radiant flux of the device light in the 550-600 nm wavelength range; (B) the method further comprises: changing (in a second operational mode) from a third device light setting to a fourth device light setting, different from the third device light setting; (C) the third device light setting and the fourth device light setting are selected from: (a) a high radiant flux third setting ($S_3$) wherein the device light is third light with a third radiant flux $I_3$ and a third B/Y ratio $R_3$; and (b) a low radiant flux fourth setting ($S_4$) wherein the device light is fourth light with a fourth radiant flux $I_3$ and a fourth B/Y ratio $R_3$; and (D) $I_4<I_3$, and $R_3>R_4$.

Further embodiments in relation to this (second) operational mode are also described above.

In a specific embodiment, the method may further comprise: changing (in a third operational mode) from the third device light setting to the second device light setting, different from the third device light setting; wherein (i) the third device light setting and the first device light setting are selected from: (a) the high radiant flux setting ($S_3$) wherein the device light is third light with the third radiant flux $I_3$ and the third B/Y ratio $R_3$; and (b)) the low radiant flux second setting ($S_2$) wherein the device light is second light with the second radiant flux $I_2$ and the second B/Y ratio $R_2$ as defined herein. Especially, in embodiments $I_2<I_3$. Further, in specific embodiments $0.5 \leq R_2/R_3 \leq 0.95$.

Yet, in a further aspect the invention provides a method for controlling a controllable radiant flux and a controllable spectral power distribution of device light wherein: (A) a ratio B/Y of the device light is defined as a ratio of a radiant flux of the device light in the 450-500 nm wavelength range and of a radiant flux of the device light in the 550-600 nm wavelength range; (B) the method further comprises changing (in a third operational mode) from the third device light setting to the second device light setting, different from the third device light setting; (C) the third device light setting and the first device light setting are selected from: (a) the high radiant flux setting ($S_3$) wherein the device light is third light with the third radiant flux $I_3$ and the third B/Y ratio $R_3$; and (b)) the low radiant flux second setting ($S_2$) wherein the device light is second light with the second radiant flux $I_2$ and the second B/Y ratio $R_2$ according to any one of the preceding claims; and (D) $I_3<I_2$, and $0.5 \leq R_2/R_3 \leq 0.95$.

Further embodiments in relation to this (third) operational mode are also described above.

In general, the invention also provides a method for controlling a controllable radiant flux and a controllable spectral power distribution of device light wherein: (A) a ratio B/Y of the device light is defined as a ratio of a radiant flux of the device light in the 450-500 nm wavelength range and of a radiant flux of the device light in the 550-600 nm wavelength range; (B) the method comprises changing (in an operational mode) from a first device light setting to a second device light setting, different from the first device light setting; (C) the first device light setting and the second device light setting are selected from: (a) a high radiant flux first setting ($S_1$), (b) a low radiant flux second setting ($S_2$), (c) a high radiant flux third setting ($S_3$), (b) a low radiant flux fourth setting ($S_4$) wherein the first device light setting and the second device light setting differ (and wherein the settings $S_1$-$S_4$ are as defined herein).

Here below, some further embodiments are provided:

| Light level | Sleep/rest-no melatonin suppression | Alert/active-melatonin suppression |
|---|---|---|
| Low light level | $0.25 \leq R_2 \leq 2.2$ | $0.05 \leq R_4 < 0.25$ |
| High light level | $0.05 \leq R_1 < 0.25$ | $0.25 \leq R_3 \leq 2.2$ |

Several types of lighting may be considered.

For instance, a first type (or category) of lighting may refer to lighting in or of e.g. a parking garage, a quay, a dock, etc. Here, the illuminance of a parking garage deck, the quay, the dock, may be in the order of 75-100 lux. Measuring on, and perpendicular to the optical axis of the light source, the luminous intensity may be selected from the range of about 675-222,000 candela.

For instance, a second type (or category) of lighting may refer to lighting in homes, in warehouses, in auditoria, at outdoor sports, at (petro)chemical plants, at offshore platforms, in public parks, in restrooms, in corridors, in changing rooms, in living rooms, in dining rooms, in bedrooms, in bathrooms, etc. Here, the illuminance may be in the order of about 100-200 lux. At 1 m of the light generating device the luminous intensity may be selected from the range of about 400-80,000 candela.

For instance, a third type (or category) of lighting may refer to lighting in offices, at assembly lines, in machine shops, in schools, in training rooms, in museums, in cafeterias, in ICUs, in hospital rooms, etc. Here, the illuminance may be in the order of about 200-750 lux. At 1 m of the light generating device the luminous intensity may be selected from the range of about 800-48,000 candela.

For instance, a fourth type (or category) of lighting may refer to lighting of detailed work, of food processing, in supermarkets, in elderly homes, in nursery homes, etc. Here, the illuminance may be in the order of about 750-1000 lux. At 1 m of the light generating device the luminous intensity may be selected from the range of about 3000-64,000 candela.

Yet a fifth type (or category) of lighting may refer to road lighting and street lighting, park lighting, squares, emergency lighting. The illuminance at the road or street may be in the order of about 3-75 lux. At 1 m of the light generating device the luminous intensity may be selected from the range of about 12-30,000 candela.

The amount of illumination the eye receives, may however be different, as the former indicated illuminance values for the four categories may be horizontal illuminances, whereas the eye may essentially receive vertical illuminance, unless the observer is lying in a position where he/she is looking upwards.

It appears that in the range of about 20-40 lux of illuminance falling at the human eye, such as in the range of 24-36 lux, like in the range of about 28-32 lux, such as at about 30 lux, the change takes place that at lower illuminance a higher R value (i.e. a higher blue/yellow ratio) does not (or less) suppress melatonin levels, whereas at higher illuminances, a lower R value (i.e. a lower blue/yellow ratio) does not (or less) suppress melatonin levels.

Therefore, for category 1 lighting the low light level may be about at maximum 80% of the maximum of the illuminance and a high light level may be about at least about 40% of the maximum of the illuminance. Of course, the illuminance of the low light level is lower than of the high light level. In specific embodiments, for category 1 lighting the low light level may be about at maximum 40% of the maximum of the illuminance and a high light level may be about at least about 80% of the maximum of the illuminance.

Therefore, for category 2 lighting the low light level may be about at maximum 75% of the maximum of the illuminance and a high light level may be about at least about 30% of the maximum of the illuminance. Of course, the illuminance of the low light level is lower than of the high light level. In specific embodiments, for category 2 lighting the low light level may be about at maximum 30% of the maximum of the illuminance and a high light level may be about at least about 75% of the maximum of the illuminance.

Therefore, for category 3 lighting the low light level may be about at maximum 25% of the maximum of the illuminance and a high light level may be about at least about 10% of the maximum of the illuminance. Of course, the illuminance of the low light level is lower than of the high light level. In specific embodiments, for category 3 lighting the low light level may be about at maximum 10% of the maximum of the illuminance and a high light level may be about at least about 25% of the maximum of the illuminance.

Therefore, for category 4 lighting the low light level may be about at maximum 10% of the maximum of the illuminance and a high light level may be about at least about 7.5% of the maximum of the illuminance. Of course, the illuminance of the low light level is lower than of the high light level. In specific embodiments, for category 4 lighting the low light level may be about at maximum 7.5% of the maximum of the illuminance and a high light level may be about at least about 10% of the maximum of the illuminance.

Therefore, for category 5 lighting the low light level may be about at maximum 70% of the maximum of the illuminance and a high light level may be about at least about 60% of the maximum of the illuminance. Of course, the illuminance of the low light level is lower than of the high light level. In specific embodiments, for category 5 lighting the low light level may be about at maximum 60% of the maximum of the illuminance and a high light level may be about at least about 70% of the maximum of the illuminance.

In an aspect, the invention provides a method wherein one of the following applies: (i) reducing the radiant flux while increasing the correlated color temperature, and (ii) increasing the radiant flux while decreasing the correlated color temperature.

The invention also provides a light generating system which is configured to execute in an operational mode one of the following: (i) reducing the radiant flux while increasing the correlated color temperature, and (ii) increasing the radiant flux while decreasing the correlated color temperature.

Especially, the luminous intensity may be determined at 1 meter of the source of light.

In embodiments, the change from one device light setting to another device light setting may be a change from a B/Y ratio of at least 0.25 to a B/Y ratio below 0.25. In other embodiments, the change from (the) one device light setting to another device light setting may in be a change from a B/Y ratio of below 0.25 to a B/Y ratio of at least 0.25. In embodiments, the change in ratio may be at least 0.02, more especially be at least 0.05, such as at least 0.1, like in specific embodiments at least 0.15. In embodiments, the one device light setting is a high radiation flux setting and the other device light setting is a low radiation flux setting. In embodiments, the one device light setting is a low radiation flux setting and the other device light setting is a high radiation flux setting. In embodiments, the one device light setting and the other device light setting may essentially have the same radiation flux settings.

In embodiments, the change from one device light setting to another device light setting may be a change from a B/Y ratio of at least 0.25 to another ratio of at least 0.25. In embodiments, the change in ratio may be at least 0.02, more especially be at least 0.05, such as at least 0.1, like in specific embodiments at least 0.15. In embodiments, the one device light setting is a high radiation flux setting and the other device light setting is a low radiation flux setting. In embodiments, the one device light setting is a low radiation flux setting and the other device light setting is a high radiation flux setting. In embodiments, the one device light setting and the other device light setting may essentially have the same radiation flux settings.

In embodiments, the change from one device light setting to another device light setting may be a change from a B/Y ratio of lower than 0.25 to another ratio of lower than 0.25. In embodiments, the change in ratio may be at least 0.02, more especially be at least 0.05. In embodiments, the one device light setting is a high radiation flux setting and the other device light setting is a low radiation flux setting. In embodiments, the one device light setting is a low radiation flux setting and the other device light setting is a high radiation flux setting. In embodiments, the one device light setting and the other device light setting may essentially have the same radiation flux settings.

Hence, a change from one device light setting to another device light setting, different from the one device light setting, may imply a difference in R-value of at least 0.02, more especially at least 0.05. By e.g. changing the spectral power distribution, the R-value may be changed.

In embodiments, the change from one device light setting to another device light setting may be a change from a high radiation flux setting to a low radiation flux setting. In embodiments, there may be no change in B/Y ratio. In other embodiments, there may be an increase in B/Y ratio. In yet other embodiments, there may be a decrease in B/Y ratio.

In embodiments, the change from one device light setting to another device light setting may be a change from a low radiation flux setting to a high radiation flux setting. In embodiments, there may be no change in B/Y ratio. In other embodiments, there may be an increase in B/Y ratio. In yet other embodiments, there may be a decrease in B/Y ratio.

In embodiments, the light generating system may be configured such that in normal use users may experience in a one of the device light settings an illuminance of over 30 lux and in another device light setting an illuminance of smaller than 30 lux. Especially, this may be the illuminances at the (human eye). Hence, in specific embodiments, the change from (the) one device light setting to another device light setting may include a change from below to above, or from above to below, 30 lux illuminance at the human eye.

A reason for an $S_3 \rightarrow S_2$ transition could be: at a higher radiant flux setting, alertness may be desired (and melatonin level may be suppressed); when dimming to a lower radiant flux setting, it may be desirable that the melatonin level is not suppressed (benefit for sleep). Instead of choosing warmer light (lower R), the light may be relatively cool, and R may remain above 0.25. Of course, for an $S_2$+*$S_3$ transition the same may apply, but then from a lower radiant flux level it is updimmed to a higher radiant flux level.

Yet further, in specific embodiments the third device light setting and the first device light setting may be selected from: (a) the high radiant flux setting (S3) wherein the device light is third light with the third radiant flux $I_3$ and the third B/Y ratio $R_3$. In specific embodiments, $R_2>R_3$. This may lead to a transition between setting wherein dR/dI<0. For instance, assume a high 13, with a relatively low CCT (relatively low R value), such as e.g. CCT=3000 K, which may provide visual comfort. Upon dimming to a lower radiant flux $I_2$, it may in embodiments be desirable that people can sleep, i.e. no substantial melatonin level suppression. Then, it may be desirable to have an R value above 0.25, e.g. by light with a CCT of at least 4500 K.

In embodiments, the light generating system may comprise one or more first light sources configured to generate visible light having a correlated color temperature of at maximum 1800 K, and one or more second light sources configured to generate blue light. Especially, at maximum power the radiant flux of the one or more second light sources is smaller than of the one or more first light sources, such as at least 2 times smaller. Such light generating system may be used to control changes form S1-S2. Especially, the one or more first light sources comprise solid state light sources, like LEDs. Especially, the one or more second light sources comprise solid state light sources, like LEDs.

In embodiments, the light generating system may comprise one or more first light sources configured to generate visible light having a correlated color temperature of at maximum 2500 K, such as at maximum 2450 K, such as e.g. 2200 K, and one or more second light sources configured to generate blue light. For instance, in embodiments the one or more first light sources configured to generate visible light may have a correlated color temperature selected from the range of 1800-2500 K.

In embodiments, the light generating system may comprise one or more third light sources configured to generate visible light having a correlated color temperature of at least 2450 K even more especially at least about 3000 K, and one or more fourth light sources configured to generate red light. Especially, at maximum power the radiant flux of the one or more fourth light sources is smaller than of the one or more third light sources, such as at least 2 times smaller. Such light generating system may be used to control changes form S3-S4. Especially, the one or more third light sources comprise solid state light sources, like LEDs. Especially, the one or more fourth light sources comprise solid state light sources, like LEDs.

The invention further provides in an aspect a computer program product enabled to carry out the method as defined herein, for instance when loaded on a computer (functionally coupled with the light generating system or the light generating device). In yet a further aspect, the invention provides a record carrier (or data carrier), such as a USB stick, a CD, DVD, a memory card, etc.) storing the computer program product as defined herein. Hence, the computer program product, when running on a computer (functionally coupled with the light generating system or the light generating device) or loaded into a computer (functionally coupled with the light generating system or the light generating device), brings about, or is capable of bringing about, the method as described herein. In yet a further aspect, the invention also provides a computer program product, which, when running on a computer which is functionally coupled to or comprised by the device, apparatus, or system, controls one or more controllable elements of such device, apparatus, or system.

In yet a further aspect, the invention also provides a computer program product, which, when running on a computer which is functionally coupled to or comprised by a device, an apparatus, or a system, such as e.g. described herein, executes the herein described method. In yet a further aspect, the invention (thus) provides a software product, which, when running on a computer (functionally coupled with the light generating system or the light generating device) is capable of bringing about (one or more embodiments of) the method as described herein.

In yet a further aspect, the invention also provides a light generating system, especially configured to provide low radiant flux light, e.g. for use in control rooms, cockpits, driver spaces in motorized vehicles, patient rooms, jails, etc., wherein notwithstanding the relatively low intensity, it may be desirable to suppress sleep and/or promote activity.

Hence, in an aspect the invention provides a light generating system, comprising a light generating device configured to provide a beam of device light, wherein: (a) the light generating system is configured to provide device light with a intensity selected from the range of 12-220,000 candela on a surface perpendicular to the optical axis at a first distance (d1) from the device, wherein d1 is 1 m, wherein the device light; (b) a ratio B/Y of the device light is defined as a ratio of a radiant flux of the device light in the 450-500 nm wavelength range and of a radiant flux of the device light in the 550-600 nm wavelength range is in specific embodiments selected from the range of $R_4<0.25$, especially selected from the range of $0.05\leq R_4<0.25$. Hence, in embodiments a static lamp for night/low intensity light application where melatonin should be suppressed is herein provided. Especially, in embodiments d1 is selected from the range of 1-4 m, and/or the illuminance is e.g. selected from the range of 5-75 lux. Especially, in embodiments the device light may have a correlated color temperature selected from the range of 800-2450 K, especially of at maximum 1200 K. In embodiments, the beam of device light has an optical axis (O). In specific embodiments, the light generating system may be configured to provide device light with a intensity selected from the range of 12-220,000 candela.

In yet another aspect, wherein melatonin suppression is not desired, the invention provides a light generating system comprising a light generating device configured to provide a beam of device light, wherein: (a) the beam of device light has an optical axis (O); the light generating system is configured to provide device light with a intensity selected from the range of 12-220,000 candela on a surface perpendicular to the optical axis at a first distance (d1) from the device, wherein d1 is selected from the range of 1 m; and (c) a ratio B/Y of the device light is defined as a ratio of a radiant flux of the device light in the 450-500 nm wavelength range and of a radiant flux of the device light in the 550-600 nm wavelength range is selected from the range of $0.25\leq R_2<2.2$.

In yet another aspect, the light generating system may comprise one or more first light sources configured to generate first (white) light having a first correlated color temperature CCT1. The one or more first light sources together may have a first maximum electrical power W1. The one or more first light sources may configured to generate first light having a first luminous flux F1. Further, the light generating system may comprise one or more second light sources configured to generate second (white) light having a second correlated color temperature CCT2. The one or more second light sources together may have a second maximum electrical power W2. The one or more second light sources may configured to generate second light having a second luminous flux F2. In embodiments, $2\leq W1/W2\leq 100$, like especially $4\leq W1/W2\leq 100$, such as especially $8\leq W1/W2\leq 50$, more especially $10\leq W1/W2\leq 25$. In embodiments, $1.5\leq F1/F2\leq 20$, more especially $2.5\leq F1/F2\leq 10$, such as $3.5\leq F1/F2\leq 5$. In embodiments, CCT1≤2450 K, such as about 2200 K. In embodiments, CCT2≥5000 K, such as about 6500 K. In embodiments, 2000 K≤CCT2−CCT1≤5000 K.

In embodiments, the first light has a first x color coordinate $x_1$ and the second light has a second x color coordinate $x_2$, wherein $x_1$ is equal to or larger than a predetermined x value $x_p$, and wherein $x_2$ is equal to or smaller than the predetermined value, wherein the coordinates are according to CIE 1931, and wherein $x_2<x_1$. In embodiments, $x_p$ is selected from the range of about 0.35-0.4. For instance, $x_2$ is smaller than 0.35 and $x_1$ is larger than 0.35. Or, for instance, $x_2$ is smaller than 0.4 and $x_1$ is larger than 0.4. In embodiments, $x_1-x_2\geq 0.03$, such as $x_1-x_2\geq 0.05$, like in specific embodiments $x_1-x_2\geq 0.1$.

Hence, in specific embodiments the light generating system may comprise one or more first light sources configured to generate first (white) light, wherein the first light has a first x color coordinate $x_1$, and one or more second light sources configured to generate second (white) light, wherein the second light has a second x color coordinate $x_2$, wherein $x_1\geq 0.35$, wherein $x_2\leq 0.4$, wherein $x_1-x_2\geq 0.03$, wherein the one or more first light sources together may have a first maximum electrical power W1, wherein the one or more second light sources together may have a second maximum electrical power W2, and wherein $2\leq W1/W2\leq 100$, such as especially $4\leq W1/W2\leq 100$. The system light may comprise one or more of the first light and the second light, and the spectral power distribution of the system light may be controllable (especially by controlling the one or more first light sources and the one or more second light sources. Hence, the light generating device may comprise one or more first light sources and one or more second light sources.

Especially, the color coordinates are according to CIE 1931 (color space).

In embodiments (of the method), the method may comprise executing a change in radiant flux I and B/Y ratio R such that $dR/dI<0$.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

Light that escapes from the system may be indicated as system light. Especially, the system light may in embodiments essentially consist of the deice light of the light generating device.

In specific embodiments, the light generating system may comprise a parking garage lighting device, a quay lighting device a dock lighting device, road lighting device, a street lighting device, a park lighting device, a square lighting device, an emergency lighting device, a tunnel lighting device, an area lighting device, an office lighting device, an industry lighting devices, a residential lighting device, a hospital lighting device, a patient room lighting device, a retail lighting device, a warehouse lighting device, a stable lighting device, and an animal holding lighting device. However, other embodiments may also be possible.

In operational modes, the device light may comprise spectral power in one or more wavelength ranges selected from the wavelength ranges of (i) 450-500 nm and (ii) 550-600 nm. Especially, in the operational modes the device light comprise spectral power in both these wavelength ranges. The device light may also comprise spectral power in one or more wavelength ranges selected from (iii) 380-450 nm, (iv) 500-550 nm, and (v) 600-780 nm, especially in at least one of (iv) 500-550 nm, and (v) 600-780 nm. At least 90%, even more especially at least 95% of the spectral power of the device light may be in the wavelength range of 380-780 nm. Further, in embodiments at least 30% of the spectral power of the device light in the 380-780 wavelength range is in one or more wavelength ranges selected from the wavelength ranges of (i) 450-500 nm and (ii) 550-600 nm. Further, in embodiments at least 30% of the spectral power of the device light in the 380-780 wavelength range is in one or more wavelength ranges selected from the wavelength ranges of (iii) 380-450 nm, (iv) 500-550 nm, and (v) 600-780 nm.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, and an optical wireless communication device, comprising the light generating system as defined herein. The light generating device may comprise a housing or a carrier, configured to house or support, one or more elements of the light generating system. For instance, in embodiments the light generating system may comprise a housing or a carrier, configured to house or support one or more light generating devices. Hence, in yet a further aspect the invention also provides a light generating device selected from the group of a lamp, a luminaire, a projector device, a disinfection device, and an optical wireless communication device, comprising the light generating system as defined herein, especially a light generating device selected from the group of a lamp and a luminaire.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
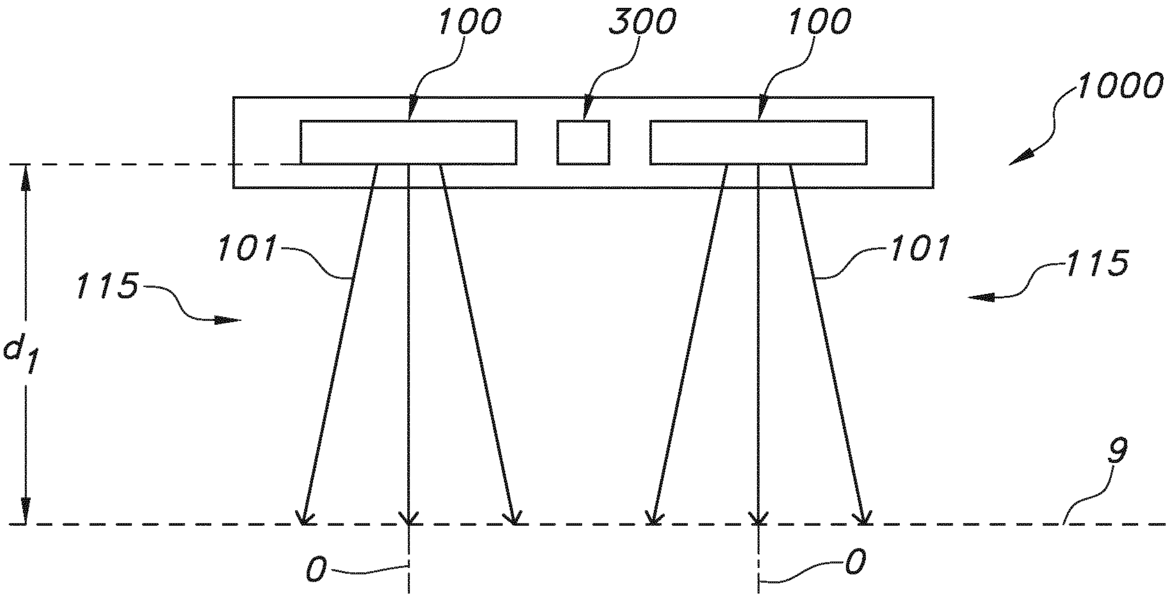
FIGS. 1*a*-1*c* schematically depicts some aspects.

FIG. 1*a* schematically depicts an embodiment of a light generating system 1000 comprising (i) a light generating device 100 configured to generate device light 101 having a controllable radiant flux and a controllable spectral power distribution, and (ii) a control system 300 configured to control the radiant flux and the spectral power distribution of the device light 101. Especially, a ratio B/Y of the device light 101 is defined as a ratio of a radiant flux of the device light 101 in the 450-500 nm wavelength range and of a radiant flux of the device light (101) in the 550-600 nm wavelength range. In embodiments, in a first operational mode of the light generating system 1000 the control system 300 is configured to change from a first device light setting to a second device light setting, different from the first device light setting. Further, in embodiments the first device light setting and the second device light setting are selected from: (a) a high radiant flux first setting $S_1$ wherein the device light 101 is first light with a first radiant flux $I_1$ and a first B/Y ratio $R_1$; and (b) a low radiant flux second setting $S_2$ wherein the device light 101 is second light with a second radiant flux $I_2$ and a second B/Y ratio $R_2$. Especially in embodiments $I_2<I_1$. Further, especially in embodiments $R_1<R_2$. $I_1$ and $I_2$ may be on energy scales, like in Watts.

In specific embodiments, the light generating device 100 is able to generate device light 101 with a maximum radiant flux $I_{max}$, wherein $I_1\geq 0.1*I_{max}$ and $I_2\leq 0.9*I_{max}$, and wherein $I_2/I_1\leq 0.9$.

Further, in specific embodiments $R_2\geq 2$.

In embodiments, the control system 300 is configured to control the change from the first device light setting to the second device light setting in dependence of one or more of an input signal of a user interface, a sensor signal, and a timer, wherein the change is a gradual change over a change time, in embodiments selected from the range of 15-120 minutes.

In further embodiments, in a second operational mode of light generating system 1000 the control system 300 is configured to change from a third device light setting to a fourth device light setting, different from the third device light setting. Especially, in embodiments the third device light setting and the fourth device light setting are selected from: (a) a high radiant flux third setting $S_3$ wherein the device light 101 is third light with a third radiant flux $I_3$ and a third B/Y ratio $R_3$; and (b) a low radiant flux fourth setting $S_4$ wherein the device light 101 is fourth light with a fourth radiant flux $I_3$ and a fourth B/Y ratio $R_3$. Especially, in embodiments $I_4<I_3$. Further, in specific embodiments $R_3>R_4$.

Especially, in embodiments the light generating device 100 is able to generate device light 101 with a maximum radiant flux $I_{max}$. Especially in embodiments $I_3\geq 0.1*I_{max}$ and $I_4\leq 0.9*I_{max}$. Further, in specific embodiments $I_4/I_3\leq 0.9$. Yet further, in embodiments the third light has a third correlated color temperature $T_{C3}$, wherein the fourth light has a fourth correlated color temperature $T_{C4}$, wherein in specific embodiments $T_{C3}\geq 4000$K, $T_{C4}\leq 3000$ K.

Yet further, in specific embodiments the control system 300 is configured to control the change from the third device light setting to the fourth device light setting in dependence of one or more of an input signal of a user interface, a sensor signal, and a timer, wherein the change is a gradual change over a change time selected from the range of 15-120 minutes.

Also in embodiments, in a third operational mode of light generating system 1000 the control system 300 is configured to change from the third device light setting to the second device light setting, different from the third device light setting. Especially, in embodiments the third device light setting and the first device light setting are selected from: (a) the high radiant flux setting $S_3$ wherein the device light 101 is third light with the third radiant flux $I_3$ and the third B/Y ratio $R_3$; and (b) the low radiant flux second setting $S_2$ wherein the device light 101 is second light with the second radiant flux $I_2$ and the second B/Y ratio $R_2$ claims. Further, in embodiments $I_2<I_3$. Especially, in embodiments $0.5\leq R_2/R_3\leq 0.95$.

Yet further, in embodiments the light generating device 100 is able to generate device light 101 with a maximum radiant flux $I_{max}$, wherein $I_3\geq 0.1*I_{max}$ and $I_2\leq 0.9*I_{max}$, and wherein $I_2/I_3\leq 0.9$.

Yet further, in embodiments the control system 300 is configured to control the change from the third device light setting to the second device light setting in dependence of one or more of an input signal of a user interface, a sensor signal, and a timer, wherein the change is a gradual change over a change time selected from the range of 15-120 minutes.

Hence, the invention also provides a method for controlling a controllable radiant flux and a controllable spectral power distribution of device light 101 wherein: (a) a ratio B/Y of the device light 101 is defined as a ratio of a radiant flux of the device light 101 in the 450-500 nm wavelength range and of a radiant flux of the device light (101) in the 550-600 nm wavelength range; (b) the method comprises changing (in a first operational mode) from a first device light setting to a second device light setting, different from the first device light setting; (c) the first device light setting and the second device light setting are selected from: (i) a high radiant flux first setting $S_1$ wherein the device light 101 is first light with a first radiant flux $I_1$ and a first B/Y ratio $R_1$; and (ii) a low radiant flux second setting $S_2$ wherein the device light 101 is second light with a second radiant flux $I_2$ and a second B/Y ratio $R_2$. Especially, in embodiments $I_2<I_1$. Further, in embodiments $R_1<R_2$.

In specific embodiments, the control system 300 is configured to control the change from the third device light setting to the fourth device light setting in dependence of one or more of an input signal of a user interface, a sensor signal, and a timer, wherein the change is a gradual change over a change time selected from the range of 15-120 minutes.

The method comprises changing in a second operational mode from a third device light setting to a fourth device light setting, different from the third device light setting. The third device light setting and the fourth device light setting are selected from: (a) a high radiant flux third setting $S_3$ wherein the device light 101 is third light with a third radiant flux $I_3$ and a third B/Y ratio $R_3$; and (b) a low radiant flux fourth setting $S_4$ wherein the device light 101 is fourth light with a fourth radiant flux $I_3$ and a fourth B/Y ratio $R_3$, wherein $I_4<I_3$ and wherein $R_3>R_4$.

Yet further, in specific embodiments the method comprises changing (in a third operational mode) from the third device light setting to the second device light setting, different from the third device light setting. Especially, in embodiments the third device light setting and the first device light setting are selected from: (a) the high radiant flux setting $S_3$ wherein the device light 101 is third light with the third radiant flux $I_3$ and the third B/Y ratio $R_3$; and (b) the low radiant flux second setting $S_2$ wherein the device light 101 is second light with the second radiant flux $I_2$ and the second B/Y ratio $R_2$ according to any one of the preceding claims. Especially, in embodiments $I_3<I_2$. Further, in specific embodiments $0.5\leq R_2/R_3\leq 0.95$.

Figure 1B:
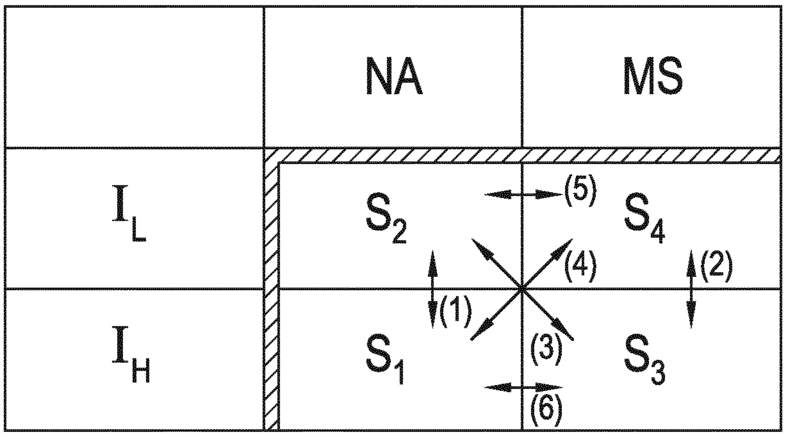

Referring to FIG. 1*b*, four possible states are indicated, wherein the column NA indicates "non-active" states and column MS indicate "melatonin suppression" states (or active states). References IL and IH indicate a low radiant flux light level and high radiant flux light level, respectively. References (1), (2), (3), and (4) indicate the first operational mode, the second operational mode, the third operational mode, and the fourth operational mode, respectively. References 5 and 6, indicate other operational modes, wherein an S2-S4 or S1-S3 transition may take place, respectively.

Figure 1C:
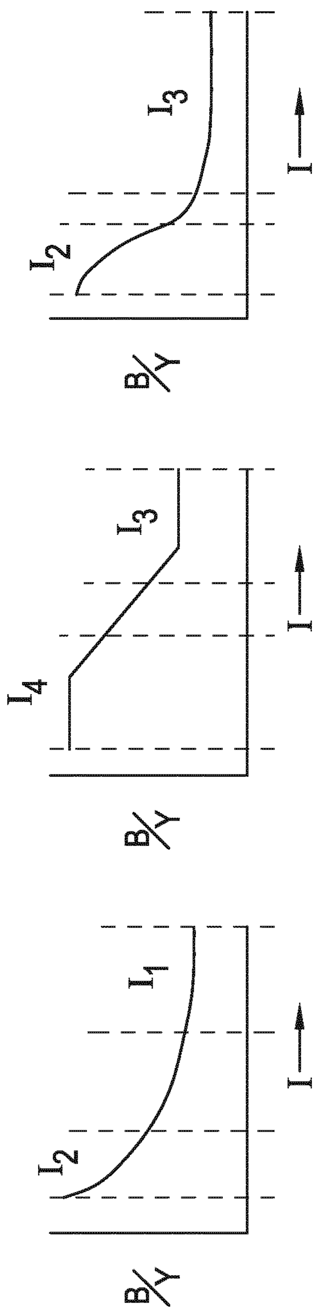

Referring to FIG. 1*c*, schematically some possible changes in intensity between a low radiant flux state and a high radiant flux state are depicted. Note that other changes may also be possible, like an abrupt change. On the y-axis the B/Y ratios (or R value) is indicated, and on the x-axis the intensity, between 0% and 100%.

Figure 2:
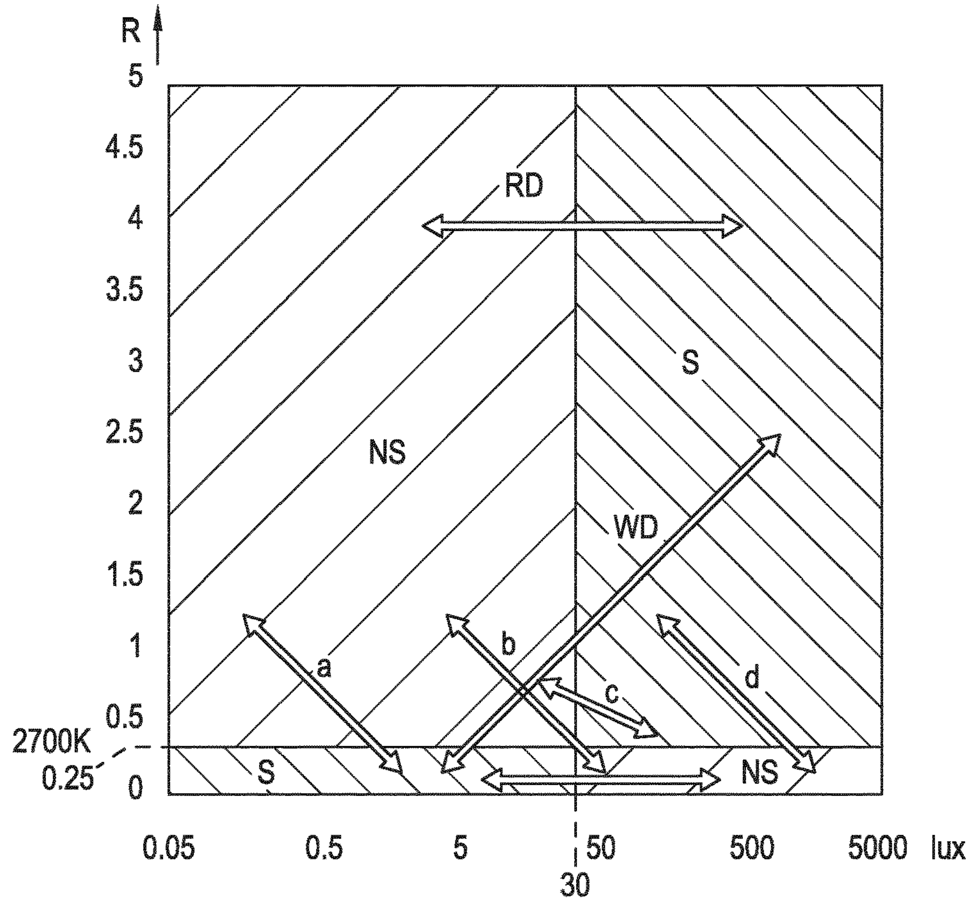
FIG. 2 schematically depicts dimming regions and the effect on melatonin.

FIG. 2 schematically depicts a graph similar to the table of FIG. 1*b*. On the y-axis, R values are indicated, and exemplary possible correlated color temperature are added as well. On the x-axis the lux on the human eye are indicated, between about 0.05-5000 lux. References S and NS indicated melatonin suppression and no melatonin suppression, respectively. Reference a schematically depicts road light dimming. Reference b indicates home light dimming or patient room dimming, and reference c indicates another example of patient dimming. For instance, in one situation one may not want to disturb the patient sleep but provide for a good visual inspection; while in another situation one may want to promote falling asleep or waking up. Reference d indicates an example of a work-sleep transition. Reference RD indicates regular dimming and reference WD indicates warm dimming. Regular dimming may especially imply that the CCT remains essentially constant while the flux changes and warm dimming may especially imply that the CCT decreases with decreasing flux.

Figure 3:
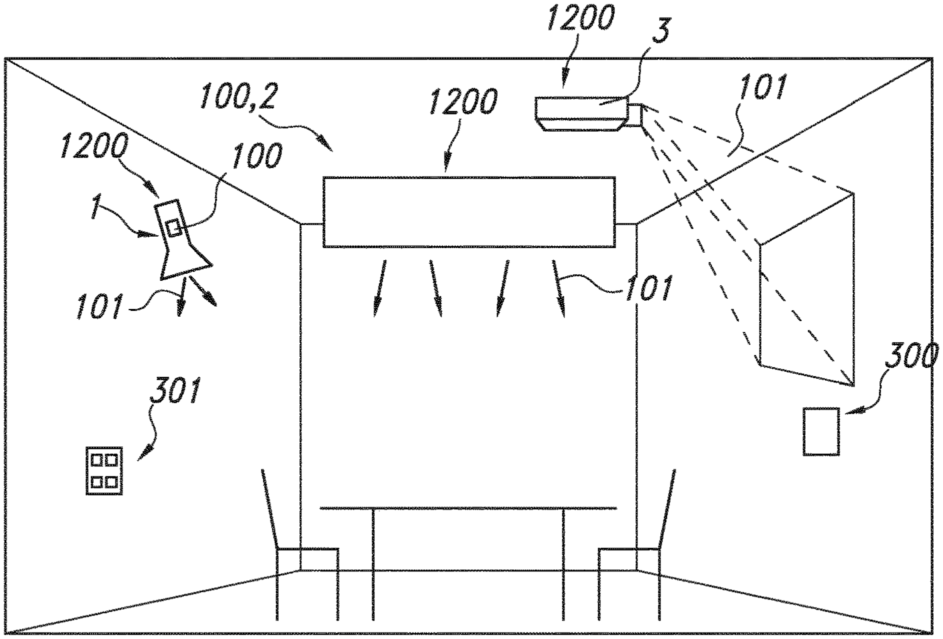
FIG. 3 schematically depict some (application) embodiments. The schematic drawings are not necessarily to scale.

FIG. 3 schematically depicts some embodiments of such light generating systems, such as light generating devices 1200 selected from the group of a lamp 1, a luminaire 2, a projector device 3, a disinfection device, and an optical wireless communication device, comprising the light generating system 1000 as defined herein. FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000.

Referring to FIG. 1*a* and FIG. 3, the invention may also provide a stationary system, like a system essentially having no controllability of the spectral power distribution (and/or a system having essentially no controllability of the intensity). In aspects, the invention also provides a light generating system 1000 comprising a light generating device 100 configured to provide a beam 115 of device light 101, wherein: (a) the beam 115 of device light 101 has an optical axis O; (b) the light generating system 1000 is configured to provide device light 101 with a intensity selected from the range of 12-220,000 candela on a surface 9 perpendicular to the optical axis at a first distance d1 from the device 100, wherein d1 is 1 m, wherein the device light 101; (c) a ratio B/Y of the device light 101 is defined as a ratio of a radiant flux of the device light 101 in the 450-500 nm wavelength range and of a radiant flux of the device light (101) in the 550-600 nm wavelength range is at least 2. In an Example, a road lighting luminaire, with 2000 lumen at 2300 K, B/Y=0.192 is used. The value of $E_{eye}$ may be below 30 lux. In early evening rush hour (first hours and last hours of lighted period) alertness matters for road users, a value of B/Y<0.25 may be chosen, which may be achieved using 10 white LEDs (2200 K) powered at a total of 9.75 $W_{el}$, producing 6.23 $W_{opt}$. During quiet hours of the night: less disturbance of residents and occasional road users, the value of B/Y>0.25, and dimming to 25% of nominal level. The same 10 white LEDs powered at 2.25 $W_{el}$, and one additional blue (450 nm) LED, powered with 1.0 $W_{el}$, together producing 500 lm (2.20 $W_{opt}$) at 3800 K, and a value of B/Y=1.68 may be chosen. To achieve the required shift in B/Y, a ratio of the 'installed power' of the two LED colors in the range e.g. $1\%\leq P_{Blue}/P_{White}\leq 45\%$ may be required.

In an example, in a living room, during the evening one may desire to study, where 200 lux $E_h$ may be needed for visual performance and comfort, and 100 lux $E_{eye}$, 2350 K white light, using 5 W LED lamps, producing 1100 lm, R=0.227 (not suppressing). However, when later at early night, and relaxation is desired (after studying, before going to sleep, no suppression desired) the light may be dimmed to 20 lux $E_{eye}$ (20%), and adding 0.23 $W_{el}$ of 6500 K white LED light, to get a flux of 220 lm, of 2850 K, and a value of R=0.49.

In the above example, many people find 2350 K more uncomfortable (more fatiguing) for high spatial resolution visual tasks (e.g. reading, needle work) compared to higher CCTs. An option is to set illuminance for visually demanding tasks to just below threshold (e.g. $E_{eye}$=20 lux, but choose higher CCT and/or R value (e.g. 4200 K, R=1.65). Later in the evening, a cozier atmosphere can be created by changing to a lower CCT (e.g. 2400 K (R can be about 0.23)) but to prevent melatonin suppression, the light level may be slightly increased (the opposite of warm dimming) e.g. to 40 lux $E_{eye}$. The high light level can be made using LEDs of 2400 K (9.5 $W_{el}$, 2000 lm, R=0.246), dimming these to 48% and adding 1.9 $W_{el}$ (1.33 $W_{opt}$) of 450 nm blue LED, gives a flux of 1000 lm, R=1.65 (CCT=4200 K).

In an example, in outdoor sports/area/workplace lighting, during hours of high activity (or sports training/match) 100 lux $E_{hor}$, which may equal to about 40 lux $E_{eye}$ may be chosen (high visual performance needed, no melatonin suppression). Light of 2400 K, R=0.23 may be provided. This may be produced using 100 LEDs, consuming 120 $W_{el}$, giving 21000 lm. At hours of lower activity, lighting is dimmed to save energy and to reduce melatonin suppression. The light may be dimmed to 8 lux $E_{eye}$, a flux of 4000 lm, the value of R=1.0 (about 3000 K) by dimming white LEDs to 18 W and adding 4 $W_{el}$ (2.8 $W_{opt}$) of 480 nm blue LED.

In an example, e.g. for lighting for animal holdings/housing (e.g. Dairy cattle stable, pigs, chickens, aquaculture, zoo's . . . ), it may be desirable to extend the photoperiod beyond daylight with sufficiently high $E_{eye}$, with e.g. >100 lux, to suppress melatonin. A light source of 36,000 lumen, CCT of 4500 K, may be applied, producing $E_{eye}$=100 lux. During the extended photoperiod (the hours (typically 2 to 6) in the early night, immediately after sunset, the light source may be set to produce a lower light level e.g. 20 lux with R=0.2 to still have melatonin suppression. During the intended dark phase, a surveillance/observation light may be required. Typical light levels are around 5 lux ($E_{hor}$). To prevent melatonin suppression, R may be >0.25, especially >0.4 (for equal visual performance of the 'farmer', with 'whiter' light (higher R, higher CCT, higher CRI) a lower light level suffices. (e.g. the farmer may better perceive at 3 lux 4000 K CRI 70 than under 5 lux red light). In both cases, these regimes may apply to the first part of the lighted period; thereafter, the CCT may go down, e.g. to below 0.2.

In an example, e.g. for lighting of a patient room (institutionalized home environments), regular daytime light may be provided, with about 200 lux $E_{eye}$ (patient may be lying down); melatonin may be suppressed with B/Y about >0.25. For instance, 3500 lm from 15 LEDs, each consuming 2 W, 3000 K, B/Y=0.412 may be applied. Dimming down to observation nightlight, no suppression may be desired, thereby providing 20 lux, with 350 lm light. This may be done by dimming the white LEDs to 2.92 $W_{el}$ and adding 0.5 $W_{el}$ Blue led, resulting in a B/Y=1.46 (5200 K).

In an example, an observation nightlight is provided, where no suppression is desirable, with R>0.25, and $E_{eye}$<30 lux. Occasionally, a higher light level can be needed for offering a more detailed view—but without suppressing melatonin; then $E_{eye}$ may become >30 lux; therefore R may be reduced to <0.25. The latter may be produced using light sources of 22 $W_{el}$ LEDs of 2350 K, giving a flux of 5100 lm at R=0.64. Dimming down to 30% and adding 1 $W_{el}$ (0.7 $W_{opt}$) of blue 450 nm LED light, may result in a flux of 1530 lm with R=0.73.

In an example, e.g. office workplace or indoor workplace, a luminaire of 4000 lm may be applied. High light level $E_{eye}$ may be >30 lux (e.g. 100 lux). For alertness, melatonin suppression is desirable. E.g. the CCT may be 4400 K, R=1.07; 10 $W_{opt}$, 12 $W_{el}$ may be applied. When dimming to $E_{eye}$=10 lux, but melatonin suppression still required R may e.g. be chosen to be 0.238. The lowest dim level may be realized using 2400 K LEDs 6 $W_{el}$ dimmed to 33%. Highest light output reached by increase to 100% and adding 12 $W_{el}$ of 6500 K white LEDs, to reach 4000 lm of 4400 K, R=1.07.

In an example, in a change from a $E_{eye}$ above 30 lux to one below 30 lux (or vice versa), while maintaining the same level of melatonin suppression (meaning R changes as well across the R=0.25 boundary), e.g. around 20 lux, R may especially be close to 0.25 to prevent an undesirable effect in melatonin suppression. So for any dimming curve going 'diagonally' (see FIG. 2), the dimming curve may be a continuous function, passing through a region given by the boundaries $20 \leq E_{eye} \leq 40$ lux and/or $0.2 \leq R \leq 0.3$. In other words, when dimming, while the same level of melatonin suppression may desirably be maintained, when $E_{eye}$ is between 20 and 40 lux, R is desirably close to 0.25, e.g. between 0.2 and 0.3.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The invention claimed is:

1. A light generating system comprising:

(i) a light generating device configured to generate device light having a controllable radiant flux and a controllable spectral power distribution, and (ii) a control system configured to control the radiant flux and the spectral power distribution of the device light;

wherein the device light has a blue-yellow ratio (B/Y) that is defined as a ratio of a radiant flux of the device light in the 450-500 nm wavelength range and of a radiant flux of the device light in the 550-600 nm wavelength range;

wherein in a first operational mode of the light generating system, the control system is configured to change from a first device light setting to a second device light setting, the second device light setting being different from the first device light setting;

wherein the first device light setting and the second device light setting are selected from: (a) a high radiant flux first setting wherein the device light is first light with a first radiant flux ($I_1$) and a first B/Y ratio ($R_1$); and (b) a low radiant flux second setting wherein the device light is second light with a second radiant flux ($I_2$) and a second B/Y ratio ($R_2$);

wherein $I_2<I_1$, and $R_1<R_2$;

wherein in a second operational mode of light generating system, the control system is further configured to change from a third device light setting to a fourth device light setting, the fourth device light setting being different from the third device light setting;

wherein the third device light setting and the fourth device light setting are selected from: (a) a high radiant flux third setting wherein the device light is third light with a third radiant flux ($I_3$) and a third B/Y ratio ($R_3$); and (b) a low radiant flux fourth setting wherein the device light is fourth light with a fourth radiant flux ($I_4$) and a fourth B/Y ratio ($R_4$); and wherein $I_4<I_3$, and $R_3>R_4$.

2. The light generating system according to claim 1, wherein the light generating device is able to generate device light with a maximum radiant flux ($I_{max}$), wherein $I_1 \geq 0.1*I_{max}$ and $I_2 \leq 0.9*I_{max}$, and wherein $I_2/I_1 \leq 0.9$.

3. The light generating system according to claim 1, wherein $R_2 \geq 0.25$ and wherein $R_1<0.25$.

4. The light generating system according to claim 1, wherein the light generating device is configured to provide in the low radiant flux second setting a beam of device light having a maximum luminous intensity selected from the range of 12-220,000 candela; and wherein the device light in the first device light setting and the second device light setting is white light.

5. The light generating system according to claim 1, wherein $R_4 \leq 0.41$ and wherein $R_3 \geq 0.25$.

6. The light generating system according to claim 1, wherein the light generating device is able to generate device light with a maximum radiant flux ($I_{max}$), wherein $I_3 \geq 0.1*I_{max}$ and $I_4 \leq 0.9*I_{max}$, and $I_4/I_3 \leq 0.9$, and wherein $R_3 \geq 0.25$ and wherein $R_4<0.25$.

7. The light generating system according to claim 1, wherein the light generating device is configured to provide in the low radiant flux fourth setting a beam of device light having a maximum luminous intensity selected from the range of 12-220,000 candela.

8. The light generating system according to claim 1, wherein in a third operational mode of light generating system, the control system is configured to change from the third device light setting to the second device light setting, the second device light setting being different from the third device light setting;

wherein the third device light setting and the second device light setting are selected from: (a) the high radiant flux setting wherein the device light is the third light with the third radiant flux ($I_3$) and the third B/Y ratio ($R_3$); and (b) the low radiant flux second setting wherein the device light is the second light with the second radiant flux ($I_2$) and the second B/Y ratio ($R_2$); and wherein $I_2<I_3$, and $0.5 \leq R_3/R_2 \leq 0.95$.

9. The light generating system according to claim 8, wherein the light generating device is able to generate device light with a maximum radiant flux ($I_{max}$), wherein $I_3 \geq 0.1*I_{max}$ and $I_2 \leq 0.9*I_{max}$, and wherein $I_2/I_3 \leq 0.9$.

10. The light generating system according to claim 8, wherein $R_2 \geq 0.25$.

11. The light generating system according to claim 1, further comprising:

one or more first light sources configured to generate first white light, wherein the first light has a first x color coordinate ($x_1$), and one or more second light sources configured to generate second white light, wherein the second light has a second x color coordinate ($x_2$), wherein $x_1 \geq 0.35$, the color coordinates are according to CIE 1931, $x_2 \leq 0.4$, and $x_1 - x_2 \geq 0.03$, wherein the one or more first light sources together may have a first maximum electrical power ($W_1$), the one or more second light sources together may have a second maximum electrical power (W2), and $2 \leq W1/W2 \leq 100$.

12. The light generating system according to claim 1, wherein the light generating system further comprises one or more of a parking garage lighting device, a quay lighting device, a dock lighting device, a road lighting device, a street lighting device, a park lighting device, a square lighting device, an emergency lighting device, a tunnel lighting device, an area lighting device, an office lighting device, an industry lighting devices, a residential lighting device, a hospital lighting device, a patient room lighting device, a retail lighting device, a warehouse lighting device, a stable lighting device, and an animal holding lighting device.

13. The light generating system according to claim 1, wherein the light generating device is selected from the group of a lamp, a luminaire, a projector device, a disinfection device, and an optical wireless communication device.

14. A method for controlling a controllable radiant flux and a controllable spectral power distribution of device light, the method comprising:

changing from a first device light setting to a second device light setting, the second device light setting being different from the first device light setting, wherein the device light has a blue-yellow ratio (B/Y) that is defined as a ratio of a radiant flux of the device light in the 450-500 nm wavelength range and of a radiant flux of the device light in the 550-600 nm wavelength range;

wherein the first device light setting and the second device light setting are selected from: (a) a high radiant flux first setting wherein the device light is first light with a first radiant flux ($I_1$) and a first B/Y ratio ($R_1$); and (b) a low radiant flux second setting wherein the device light is second light with a second radiant flux ($I_2$) and a second B/Y ratio ($R_2$);

wherein $I_2 < I_1$, and $R_1 < R_2$; and changing from a third device light setting to a fourth device light setting, the fourth device light setting being different from the third device light setting, wherein the third device light setting and the fourth device light setting are selected from: (a) a high radiant flux third setting wherein the device light is third light with a third radiant flux ($I_3$) and a third B/Y ratio ($R_3$); and (b) a low radiant flux fourth setting wherein the device light is fourth light with a fourth radiant flux ($I_4$) and a fourth B/Y ratio ($R_4$); and wherein $I_4 < I_3$, and $R_3 > R_4$.

15. The method according to claim 14, the method further comprising:

changing from the third device light setting to the second device light setting, the second device light setting being different from the third device light setting;

wherein the third device light setting and the second device light setting are selected from: (a) the high radiant flux setting wherein the device light is third light with the third radiant flux ($I_3$) and the third B/Y ratio ($R_3$); and (b) the low radiant flux second setting wherein the device light is second light with the second radiant flux ($I_2$) and the second B/Y ratio ($R_2$); and wherein $I_2 < I_3$, and $0.5 \leq R_2/R_3 \leq 0.95$.

* * * * *